United States Patent [19]
Gonidec et al.

[11] Patent Number: 5,996,937
[45] Date of Patent: Dec. 7, 1999

[54] VARIABLE CROSS-SECTION TURBOFAN EXHAUST DUCT WITH DOOR TYPE THRUST REVERSER FOR AIRCRAFT

[75] Inventors: Patrick Gonidec, Montivilliers; Bernard Vauchel Guy, Le Havre, both of France

[73] Assignee: Societe Hispano Suiza Aerostructures, Gonfreville L'orcher, France

[21] Appl. No.: 09/096,525

[22] Filed: Jun. 12, 1998

[30] Foreign Application Priority Data

Jun. 12, 1997 [FR] France .................................. 97 07278

[51] Int. Cl.⁶ ................................ F02K 1/09; F02C 3/02
[52] U.S. Cl. .................................. 244/110 B; 239/265.19; 239/265.17; 239/365.31; 60/226.2
[58] Field of Search .................. 244/110 B; 239/265.31, 239/265.27, 265.19; 60/226.1, 226.2, 230

[56] References Cited

U.S. PATENT DOCUMENTS

| | | |
|---|---|---|
| 3,280,562 | 10/1966 | Theits . |
| 3,605,411 | 9/1971 | Maison et al. . |
| 3,779,010 | 12/1973 | Chamay et al. . |
| 3,981,451 | 9/1976 | Prior et al. . |
| 4,823,547 | 4/1989 | Newton . |
| 5,778,659 | 7/1998 | Duesler et al. ...................... 244/110 B |
| 5,853,148 | 12/1998 | Standish et al. ...................... 244/110 B |

FOREIGN PATENT DOCUMENTS

| | | |
|---|---|---|
| 1482538 | 4/1967 | France . |
| 2030034 | 10/1970 | France . |
| 2618852 | 2/1989 | France . |
| 2618853 | 2/1989 | France . |
| 2621082 | 3/1989 | France . |
| 2622929 | 3/1989 | France . |
| 2627807 | 9/1989 | France . |
| 2634251 | 1/1990 | France . |
| 2638207 | 4/1990 | France . |
| 2651021 | 2/1991 | France . |
| 1 421 153 | 1/1976 | United Kingdom . |
| 2 189 550 | 10/1987 | United Kingdom . |

*Primary Examiner*—Galen L. Barefoot
*Attorney, Agent, or Firm*—Bacon & Thomas, PLLC

[57] ABSTRACT

A variable turbofan bypass cowling includes a movable cowling assembly (12) with pivoting door type thrust reversers (20) connected to a fixed upstream cowling structure (11). The movable assembly may be translated between an upstream position whereat an upstream portion of the reverser and cowling assembly (12) is housed inside an enclosure formed by the upstream cowling structure (11) and a downstream position whereat the assembly (12) effects a variation in the exhaust duct (17) cross-section between an inner primary turbojet-engine cowling (15) and a radially inner wall of the assembly (12). The reverser doors (20) in their closed position are integrated into the cowling wall and contain at least part of the exhaust flow. When pivoted to thrust reversed positions following translation of the assembly (12) to a downstream rearward position, thrust reversal is provided in the usual manner.

10 Claims, 4 Drawing Sheets

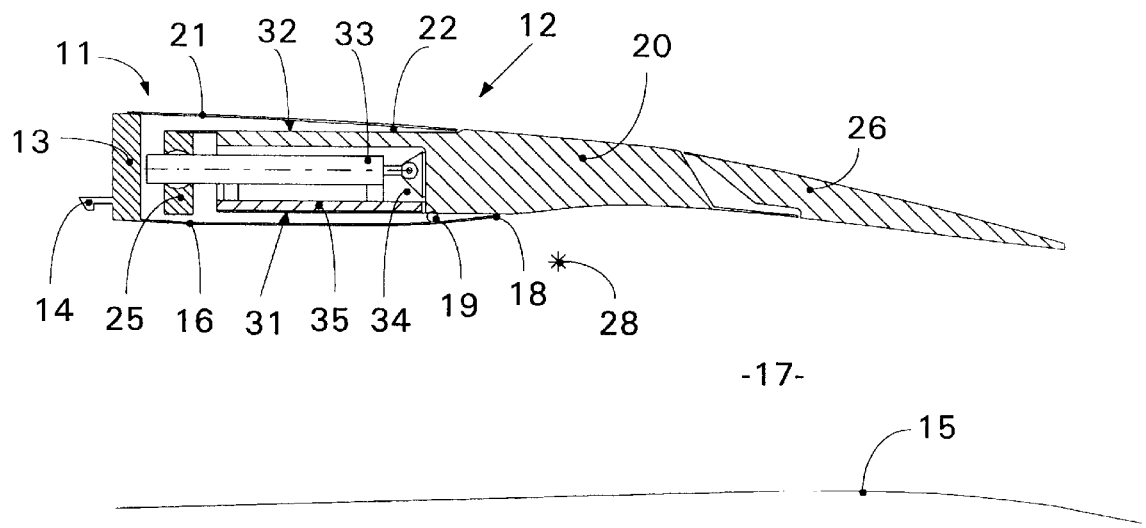
Fig : 1
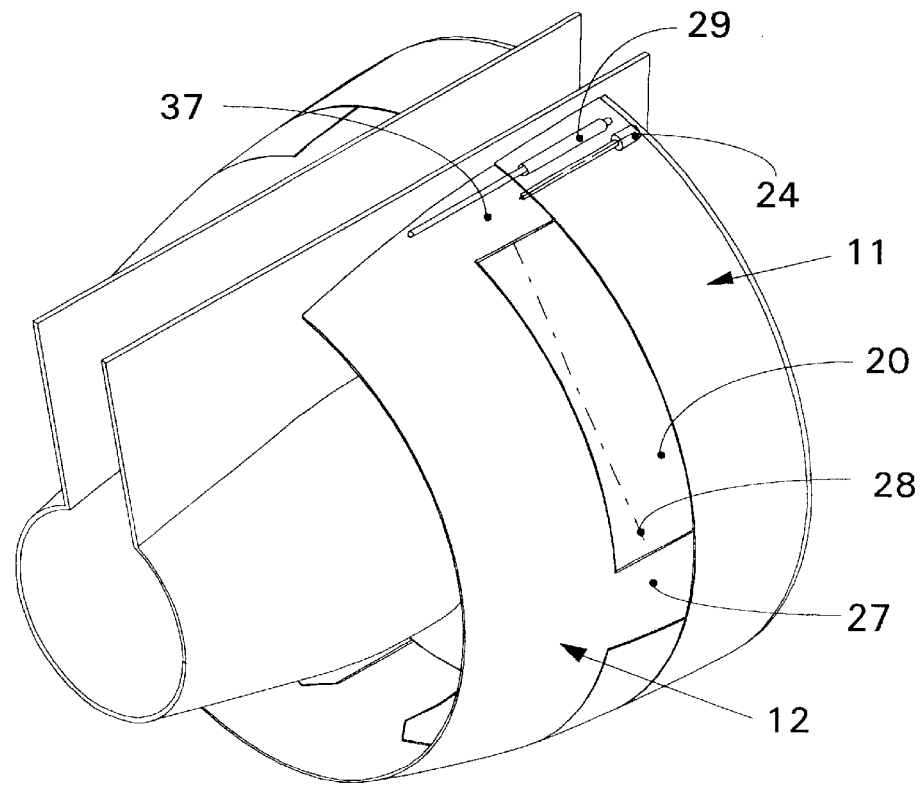
Fig : 2

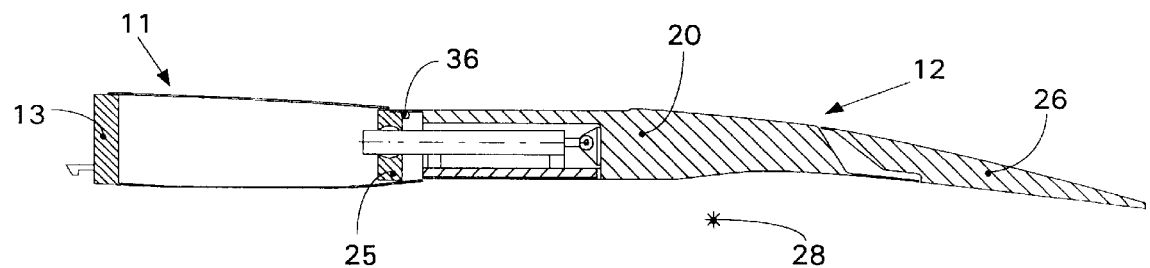
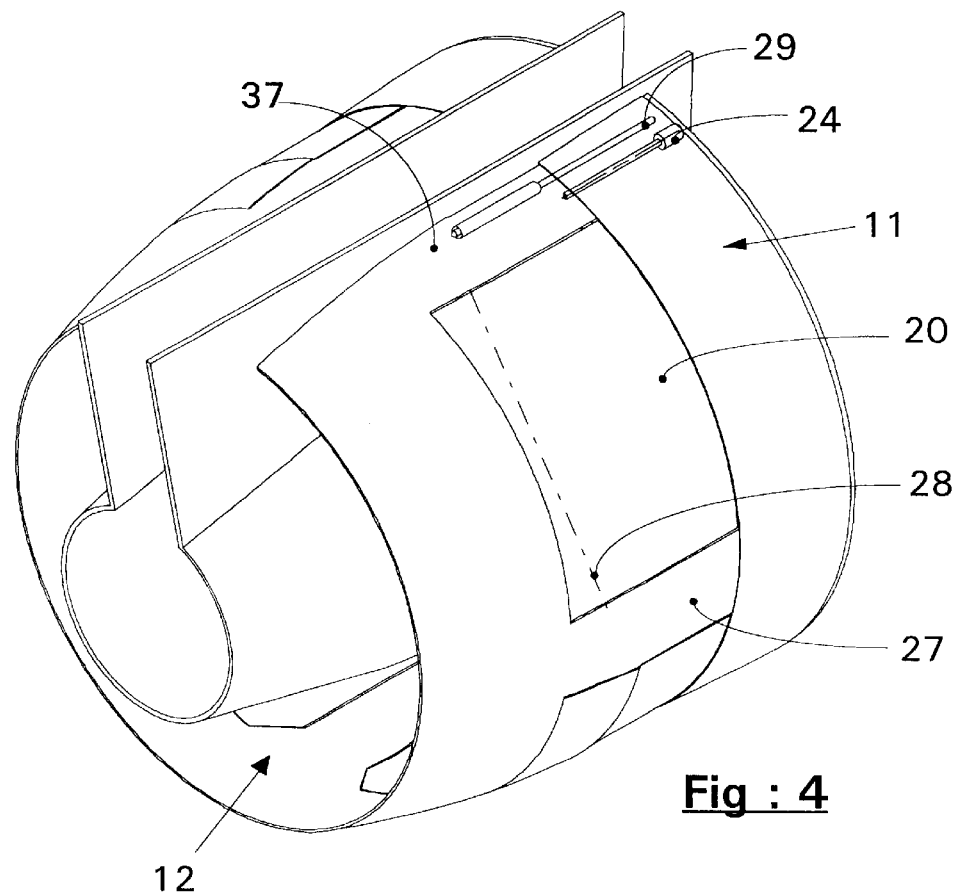
Fig : 3
Fig : 4

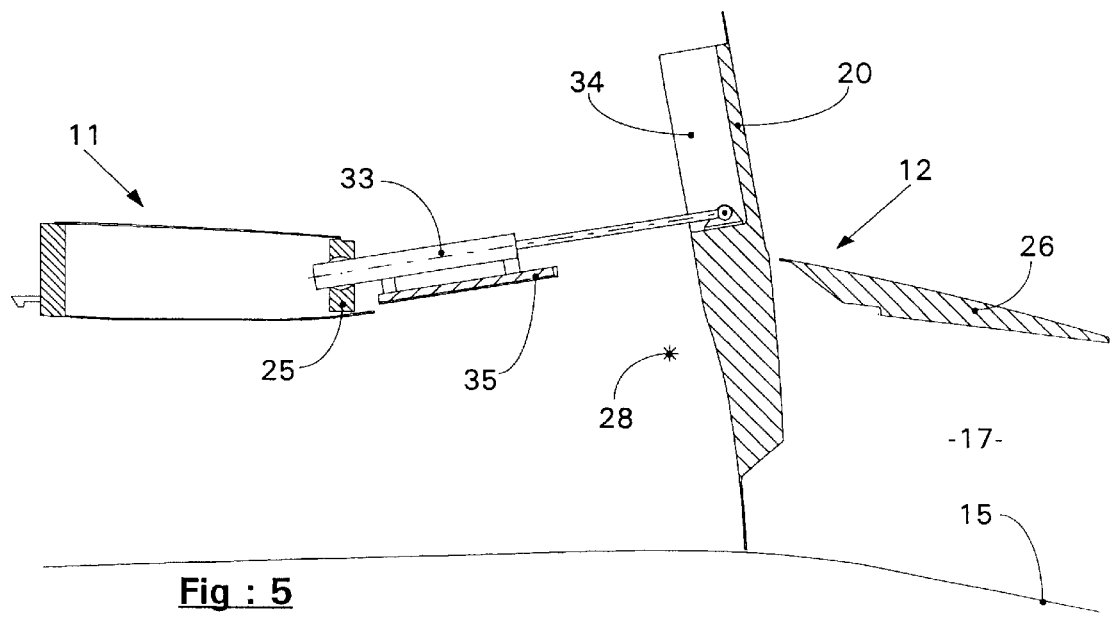
Fig : 5
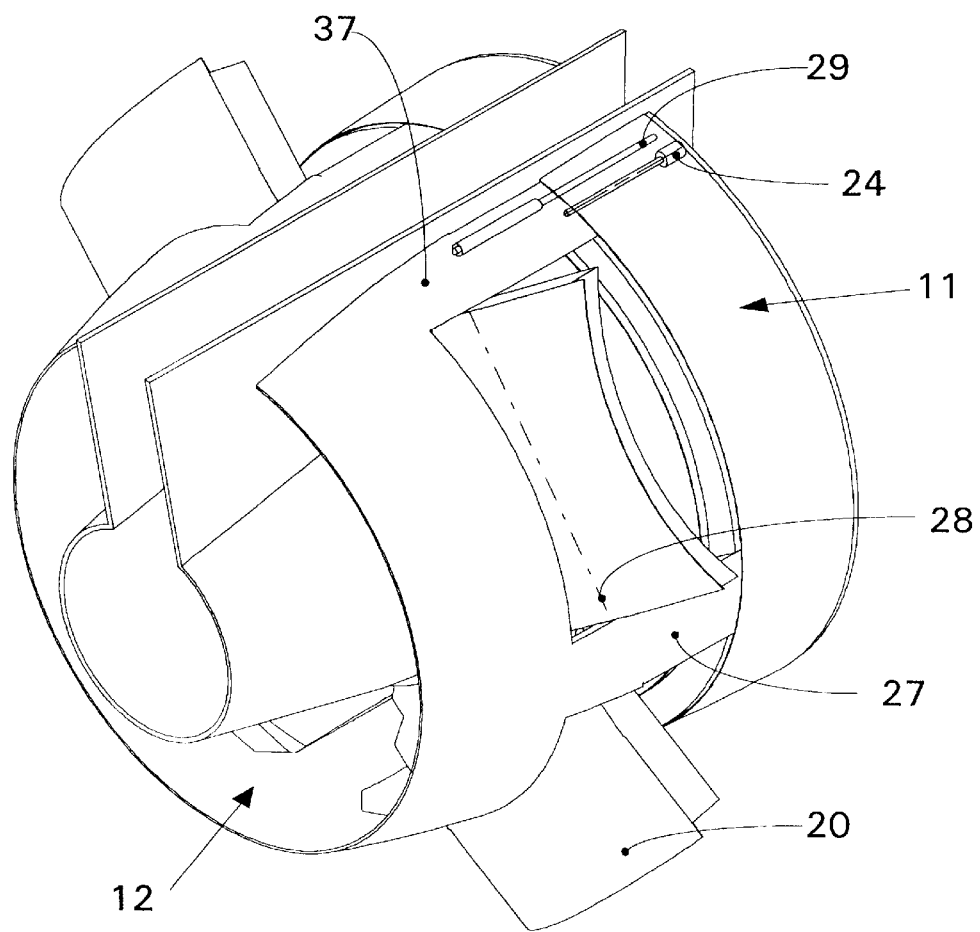
Fig : 6

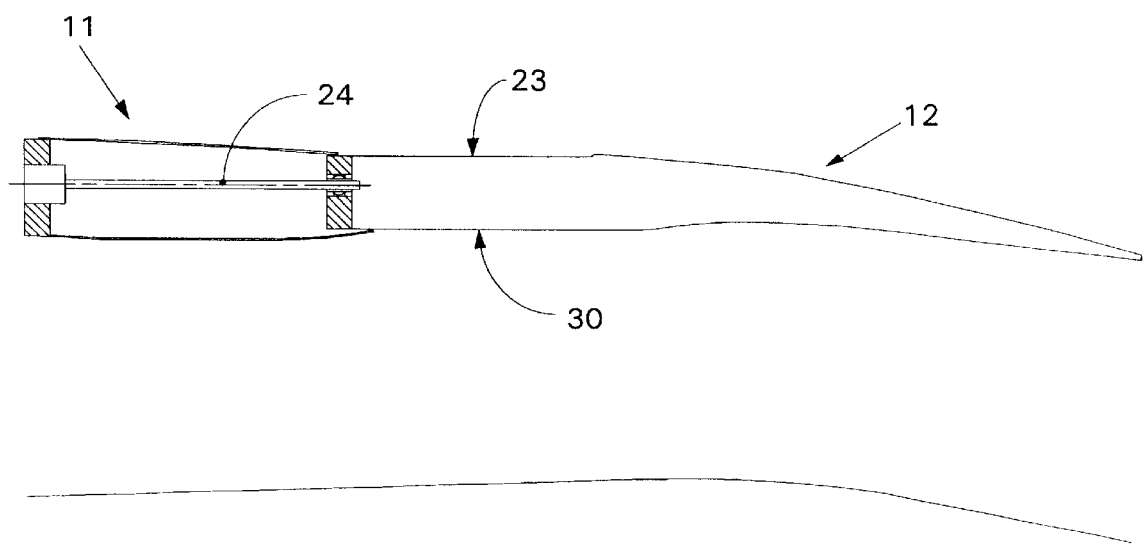
Fig : 7

VARIABLE CROSS-SECTION TURBOFAN EXHAUST DUCT WITH DOOR TYPE THRUST REVERSER FOR AIRCRAFT

BACKGROUND OF THE INVENTION

The present invention concerns a variable exhaust duct for an aircraft turbo-fan type turbojet-engine including a cowling assembly with a door type thrust reverser.

In turbofan engines, the so-called cold flow is ejected from the rear of the engine fan into an exhaust duct or nozzle which comprises an inner wall which actually is the outer surface of an inner cowling surrounding the engine proper and extending downstream of the fan, and of an outer wall, the upstream portion of which is continuous with the cowling which encloses the fan. The inner surface of the outer wall may channel both the bypass flow and the so-called hot, primary flow ejected from the engine proper, either as mixed or confluent flows, or only the bypass flow in the case of so-called separate-flow propulsion systems.

A wall also may fair the exterior surface of the cowling which encloses the fan and the exterior surface of the outer wall of the above described duct. This fairing is especially desirable for powerplants attached under the wings of an aircraft or mounted at the rear of the fuselage. Herein the combination of the outer duct wall and exterior fan cowling will be called the "external cowling".

The present invention relates to a so-called door type thrust-reverser of the type disclosed in French patent Nos. 1482538 and 2030034 and U.S. Pat. No. 3,605,411, wherein reverser doors, when in the closed position, are integrated into the engine cowling wall when in the forward thrust mode, but which may be pivoted to reversed thrust positions. The pivoting motion may be about lateral pivots and the doors may be driven by displacement control means such as, for example, linear actuators, so that the doors, when pivoted into the reversed thrust position, deflect at least part of the turbofan exhaust flow through a space constituting an outlet opening or reversal well with a forward component to attain thrust reversal.

Examples of this type of thrust reverser for turbofan type engines wherein the thrust reversers are provided with pivoting doors are disclosed illustratively in French patent documents 2618853; 2618852; 2621082; 2627807; 2634251; 2638207 and 2651021 owned in common with this application.

The thrust-reversal performance of such known devices is generally satisfactory.

However, there remains a problem in matching the engine output to the various flight phases encountered, particularly aircraft takeoff and landing, during which times the cross-sections of the bypass exhaust duct which were suitable for cruise flight may no longer be acceptable. By way of illustration, French patent 2622929 solves this problem using a cascade thrust-reverser. However, the problem remains for thrust reversers which use a plurality of deflector doors.

BRIEF SUMMARY OF THE INVENTION

The present invention provides a variable fan bypass exhaust duct with a thrust reverser, that is, thrust reverser doors, wherein the cowling and thrust reverser assembly is longitudinally moveable between a forwardly disposed, upstream position, at which position at least part of the assembly is situated inside and enclosure defined in a fixed upstream cowling structure, and a rearward downstream position. The movement of the assembly between positions is achieved by a control means, preferably affixed to fixed upstream cowling structure, in such manner that the cross-section of the fan bypass exhaust duct between the forward inner turbojet-engine cowling and the radially inner wall of the cowling and reverser assembly is varied. The thrust reverser doors are rigidly and pivotally connected to the movable assembly and the doors may be in their closed position when the assembly is in either its upstream or downstream position and are only movable into their reversed thrust position when the assembly is in its downstream position.

The invention also provides means to prevent premature opening of the thrust-reverser doors in flight (forward thrust mode).

Other objects, features and advantages of the invention are set forth in the following description of an embodiment of the invention and in relation to the attached drawings.

BRIEF DESCRIPTION OF THE FIGURES

FIG. 1 shows one embodiment of a variable fan exhaust duct according to the present invention with the elements set for cruise operation, the view being a schematic section-view taken along a longitudinal section in a plane passing through the axis of rotation of the turbo-fan type turbojet engine carrying the illustrated embodiment of the movable cowling and pivoting door thrust reverser assembly forming the variable fan exhaust duct;

FIG. 2 is a schematic rear perspective of the assembly shown in FIG. 1,

FIG. 3 is a view similar to that of FIG. 1 with the thrust reverser of the assembly in the full-power operating position, FIG. 4 is a schematic rear perspective of the assembly of FIG. 3, FIG. 5 is a view similar to that of FIG. 1 but showing the elements of the assembly with the reverser doors in the reversed thrust positions;

FIG. 6 is a schematic rear perspective of the assembly shown in FIG. 5,

FIG. 7 shows the operation of the drive for the movable cowling and thrust reverser assembly according to the present invention.

DETAILED DESCRIPTION OF THE PREFERRED EMBODIMENTS OF THE INVENTION

The variable fan exhaust duct and thrust reverser of this invention is exemplified in FIGS. 1 and 2 wherein a turbofan engine fan cowling structure is illustrated with a thrust reverser. In this design, the thrust reverser lacks a so-called "6-o'clock island" in the lower zone that would link the outer surface of the inner cowling 15 which encloses the turbo jet engine proper to the upstream fixed portion 11 of the fan cowling. The thrust reverser however could be made in two halves which would include a 6-o'clock island linking the surface of wall 15 to the fixed upstream portion 11 of the fixed cowling.

The fan exhaust duct and cowling shown in FIGS. 1 and 2 comprises a fixed forward or upstream cowling portion 11 and a moveable cowling and reverser assembly portion 12. The fixed portion 11 comprises a fixed forward frame 13 connecting the annular connector means 14 at its upstream end to the turbojet-engine. The fixed forward frame 13 supports an inner shroud 16 which defines the outer boundary of the flow in the annular exhaust duct 17 upstream of the door 20. The downstream end 18 of the inner shroud 16 may serve as a deflection edge of the thrust reverser well while a fixed external cowling shroud 21 serves as part of the exterior surface of the engine fan cowling. Where required, a sealing means may be used such as seal 22 which is placed between the downstream side of the outer zones 32 of the doors 20 and/or of the outer zones 23 of the longitudinal beams 27 and 37 extending between the doors and the inner downstream inner side of the fixed shroud 21.

A plurality of linear actuators 24, which may be hydraulic, pneumatic or electric, piston- or screw-type actuators, are connected to the fixed forward frame 13 so that they may drive the moveable downstream assembly 12 of cowling and thrust reverser. They may be operated independently or synchronized to operate in concert. Their number and arrangement are selected to optimize the mechanics of the moveable assembly 12 such as is shown in FIGS. 2 and 7.

The moveable assembly 12 supports a forward part 25 and a downstream shroud part 26. These two parts 25 and 26 are connected by longitudinal beams 27 and 37 at the 12-o'clock and at 6-o'clock positions, which beams are part of assembly 12. Thrust reverser doors 20 are mounted between the beams and constitute an upstream or forward portion of the moveable assembly 12. The beams provide support for the pivots 28 about which the doors 20 may pivot. The assembly 12 forms part of the outer streamlines for the flow in the annular duct 17 and part of the flow streamslines passing over the exterior of the cowling. The forward part 25 and the upstream parts 23 (FIG. 7) and 32 of the beams and of the doors 20, respectively, when in the cruise position are received into an enclosure defined by the fixed forward cowling structure 11, with the forward portion 32 of the door 20 being covered by a fixed external cowling shrouds 16 and 21. Upstream sealing of the door 20 when in the forward thrust mode is assured by a seal 19 located near the downstream end of the lower fixed shroud 16. The respective outer and inner upstream beam portions 23 and 30 (FIG. 7) are located on the surface of a cylinder centered on the axis of the engine or at a slight taper depending on the desired clearance between the downstream side of the external cowling shroud 21 and the upstream end of the moveable cowling and reverser assembly 12.

In the case of a 6-o'clock island cowling support system, the upper beams 37 and the lower beams include a guide means 29, for instance a rail and sliding shoe system, which permits a sliding motion with respect to the fixed structure 11.

Sliders, for instance bushings on supports, may be mounted in the beams 27 to improve guidance of the moveable assembly 12 relative to the fixed cowling 11. These components may include linear actuators 24 or they may be independent elements.

The doors 20 have the same outer and inner contours as the assembly 12. The principles of their operation and design are identical with that of the known pivoting deflector door type thrust-reversers; depending on the desired performance, there may be two, three or even more circumferentially spaced doors on the assembly 12. The upstream side of the doors may be fitted with an inwardly tapered end, this tapered end remaining inside the enclosure formed by stationary structure 11 when assembly 12 is in a forward position. The taper may also assist in re-centering the door 20 relative to the downstream side of the fixed outer cowling shroud 21 of the fixed part 11 in case locking problems or in any other circumstance interfere with normal door closure.

The doors 20 may be rotationally driven by a central linear actuator 33 as shown in FIG. 5 or by any other system known in the art such as, for instance, by means of a linear actuator in a beam or downstream of the doors. These linear actuators may be hydraulic, pneumatic, electric, screw-type or telescoping, or the like. If the linear actuator 33 is located on or near the center line of the door, the door interior cavity 34 is masked by an actuator fairing 35 (FIG. 5) which is associated with and movable with the actuator and forms a seal along its length relative to the inner surface 31 of the door 20 when the door is in the closed position.

When the assembly 12 is retracted forwardly into the enclosure defined by the fixed structure 11, the seal 19 located between the downstream side of the fixed inner shroud 16 and the center segment of the inner side 31 of the door 20, may balance or even make the door self-closing. The door 20 may carry a seal 36 at its upstream end to allow maintenance of the sealing function in all possible positions of the moveable reverser and cowling assembly 12.

FIGS. 3, 4 and 7 show how the various elements of the thrust reverser and cowling assembly 12 are moved to vary the exhaust duct cross-section. The linear actuators 24 are used to drive the assembly 12 between forwardmost and rearwardmost positions in longitudinal translation until the desired position for the appropriate engine fan performance is reached. If maximum air displacement is called for due to performance requirements, and depending on the selection, the upstream portion of the doors 20 will be located forwardmost inside the enclosure formed by the fixed upstream cowling structure 11. This configuration also precludes premature deployment of the door in all phases of flight (forward thrust) and allows the use of a light weight door locking systems. The cross-section of duct 17 is thus varied by longitudinal adjustment of the position of assembly 12.

FIGS. 5 and 6 show the assembly 12 in the reversed thrust mode of operation. The linear actuators 24 are energized to drive the assembly 12 downstream until each entire door 20 is clear of the downstream side of the fixed structure 11. At this point in deployment of the thrust reverser, the linear actuators 33 drive the doors 20 in rotation about their pivots 28 until the doors reach the position desired to achieve reversal of the flow through the annular duct 17. The drive control design for the door 20 may be linked to the drive control of the assembly 12 or the door drive control maybe independent of the drive control of the assembly 12.

The drive control design may permit operation of the doors for thrust reversal only after the exhaust duct flow variation or directly into a thrust-reversal mode.

In the reversed thrust mode of operation, the door design may be combined with a movable panel or spoiler system or any other system known in the art that provides a structural deflector at the upstream end of the door 20 in the reversed thrust mode. An open cavity in the end of the door could be used, although with a sacrifice in performance during variation of the cross section of the exhaust duct.

Re-centering means or guides may be used between the inside surface of the fixed cowling structure 11 and the upstream portion of the assembly 12, and which may be located anywhere within the various cowling elements and in engaging or nesting arrangements.

The moveable thrust reverser and cowling assembly 12 may be used with or without a rigid downstream cowling structure 26. If the downstream structure 26 is not used, the downstream portion of the doors 20 and the beams 27 and 28 may be configured to define the rearward cross-section of the exhaust duct 17. The various features disclosed above thus may be used in an arrangement which does not include the downstream structure 26.

Preferred embodiments of the invention have been described above. However, it is to be understood that various other modifications to the preferred embodiments could be made by any person skilled in the art without leaving the scope of the invention as defined in the claims that follow.

We claim:

1. A variable fan exhaust duct and thrust reverser arrangement for a turbofan-type aircraft engine comprising:

a fan and engine outer cowling including pivoted thrust reverser doors, said cowling defining, with an outer surface of an inner primary engine cowling, a fan exhaust duct, said outer cowling including a fixed forward section and a rearward assembly movable longitudinally between forwardmost and rearwardmost positions;

said reverser doors having inner and outer surfaces and being pivotally mounted on said rearward assembly for movement between a forward thrust position whereat at least a portion of the outer surfaces of the doors form at least part of the outer contour of the rearward assembly of the outer cowling and the inner surfaces form part of the exhaust duct, and a reversed thrust position whereat the pivoted doors clear reverse thrust openings in the rearward assembly of the outer cowling and deflect exhaust from the exhaust duct through the reverse thrust openings with a forward component;

said fixed forward section defining an enclosure and said doors being located at least in part in said enclosure when the rearward assembly is located at its forwardmost position, and being located completely clear of said enclosure when the rearward assembly is located at its rearwardmost position;

the cross-sectional configuration of said exhaust duct being varied upon motion of said rearward assembly between said forwardmost and rearwardmost positions.

2. The variable fan exhaust duct and thrust reverser arrangement according to claim 1, wherein said rearward assembly includes a forward portion; longitudinally extending circumferentially spaced side beams connected to the forward portion and extending rearwardly of the forward portion; said doors located between and pivotally supported by said beams rearward of the forward portion.

3. The variable fan exhaust duct and thrust reverser arrangement according to claim 2, including guide members for guiding the motion of said beams relative to said fixed forward section of said cowling.

4. The variable fan exhaust duct and thrust reverser arrangement according to claim 2, said beams and doors constituting a rearward end area of said rearward assembly.

5. The variable fan exhaust duct and thrust reverser arrangement according to claim 2, including a rigid annular shroud member located rearward of the doors, and forming a rearward continuation of the rearward assembly.

6. The variable fan exhaust duct and thrust reverser arrangement according to claim 1, said outer cowling fixed forward section including an inner longitudinal shroud and including at least one seal element located between said inner shroud and an adjacent inner surface of each door when the respective door is located within said enclosure.

7. The variable fan exhaust duct and thrust reverser arrangement according to claim 1, including linear actuators carried by said rearward assembly, said actuators each including relatively movable portions, one of said portions being connected to a respective door such that energization of the actuator causes the actuator portions to move relative to each other and causes the respective door to be pivoted between its forward and reversed thrust positions depending on the direction of energization.

8. The variable fan exhaust duct and thrust reverser arrangement according to claim 7, said rearward assembly including a forward portion located forwardly of said doors, and wherein said actuators each extend between said forward portion and a respective door.

9. The variable fan exhaust duct and thrust reverser arrangement according to claim 8, including fairing elements located towards the inner sides of and adjacent each of said actuators.

10. The variable fan exhaust duct and thrust reverser arrangement according to claim 9, one of said relatively movable actuator portions being connected to said forward portion, said fairing elements each connected to said actuator portion connected to said forward portion for movement therewith.

\* \* \* \* \*

UNITED STATES PATENT AND TRADEMARK OFFICE
CERTIFICATE OF CORRECTION

PATENT NO. : 5,996,937
DATED : December 7, 1999
INVENTOR(S) : Patrick GONIDEC et al.

It is certified that error appears in the above-identified patent and that said Letters Patent is hereby corrected as shown below:

Cover page, Item [75]; change "Bernard Vauchel Guy" to --Guy Bernard Vauchel--.

Signed and Sealed this

Twelfth Day of September, 2000

Attest:

Q. TODD DICKINSON

*Attesting Officer*    *Director of Patents and Trademarks*